United States Patent [19]
Rodriguez et al.

[11] Patent Number: 5,505,817
[45] Date of Patent: Apr. 9, 1996

[54] DEINKING WASTEPAPER USING REACTION PRODUCTS OF CASTOR OIL WITH AN ALKOXYLATED MATERIAL

[75] Inventors: José M. Rodriguez, Fort Mill, S.C.; Anthony B. Cook, Charlotte, N.C.; Gail M. Howell, Fort Mill, all of S.C.

[73] Assignee: Henkel Corporation, Plymouth Meeting, Pa.

[21] Appl. No.: 139,236

[22] Filed: Oct. 19, 1993

[51] Int. Cl.$^6$ .................................................. D21C 5/02
[52] U.S. Cl. .................................................. 162/5; 162/8
[58] Field of Search ................ 162/4, 5, 8, 26, 162/60

[56] References Cited

FOREIGN PATENT DOCUMENTS

| | | |
|---|---|---|
| 2093813 | 4/1992 | Canada . |
| 0369667 | 11/1988 | European Pat. Off. . |
| 0373375 | 11/1988 | European Pat. Off. . |
| 2148590 | 9/1971 | Germany . |
| 3101444 | 1/1981 | Germany . |
| 3923393 | 7/1989 | Germany . |
| 4032050 | 10/1990 | Germany . |
| 53-52705 | 5/1978 | Japan . |
| 63-291952 | 11/1988 | Japan . |

OTHER PUBLICATIONS

Ullmanns Encyclopädie der technischen Chemie, 4th Ed. vol. 17, pp. 570–571 (1979).
Wochenblat für Papierfabrikation 17, 646–649 (1985).
J. Am. Oil Chem. Soc. 45, 374 (1968).
"Chemische Technologie", vol. 7, pp. 131–132, Carl-Hanser-Verlag, München/Wein (1986).

*Primary Examiner*—David L. Lacey
*Assistant Examiner*—Dean T. Nguyen
*Attorney, Agent, or Firm*—Ernest G. Szoke; Wayne C. Jaeschke; Real J. Grandmaison

[57] ABSTRACT

Wastepaper containing printing ink is refined in the presence of the reaction products of castor oil with an alkoxylated fatty acid, alcohol, amine, amide, phosphate ester, polyhydroxy alcohol, or sorbitan, and the detached printing ink particles are subsequently removed from the paper stock suspensions by flotation or washing.

10 Claims, 4 Drawing Sheets

DEINKING WASTEPAPER USING REACTION PRODUCTS OF CASTOR OIL WITH AN ALKOXYLATED MATERIAL

BACKGROUND OF THE INVENTION

1. Field of the Invention

This invention relates to a process for regenerating wastepaper, and more specifically, to the use therefor of castor oil derivatives as deinking chemicals which have been prepared by reacting the hydroxy groups of castor oil with an alkoxylated fatty acid, alcohol, amine, amide, phosphate ester, polyhydroxy alcohol, or sorbitan.

In another embodiment, the invention relates to a process for regenerating wastepaper, and more specifically, to the use therefor of deinking chemicals prepared by isomerizing dienoic or trienoic compounds to conjugated intermediates and then reacting the intermediates with unsaturated fatty acids, alcohols, amines, sorbitan esters or sorbitol esters and then alkoxylating the reaction product. In an alternative embodiment, the conjugated intermediates are reacted with alkoxylated unsaturated fatty acids, alcohols, amines, sorbitan esters or sorbitol esters.

Today, wastepaper is used in large quantities for the production of, for example, newsprint and hygiene paper. Brightness and color are important quality features for papers of this type. To achieve this, the printing inks have to be removed from the printed wastepaper. This is normally done by deinking processes essentially comprising two steps, namely:

1. refining the wastepaper, i.e., fiberizing in water in the presence of the chemicals required for detachment of the printing ink particles, and
2. removal of the detached printing ink particles from the fiber suspension.

The second step can be carried out by washing or flotation (Ullmanns Encyclopädie der technischen Chemie, 4th Edition. Vol. 17, pages 570–571 (1979)). In flotation, which utilizes the difference in wetability between printing inks and paper fibers, air is forced or drawn through the fiber suspension. Small air bubbles attach themselves to the printing ink particles and form a froth at the surface of the water which is removed.

The deinking of wastepaper is normally carried out at alkaline pH values in the presence of alkali metal hydroxides, alkali metal silicates, oxidative bleaches and surfactants at temperatures in the range from 30° to 50° C. Anionic and/or nonionic surfactants, for example soaps, ethoxylated fatty alcohols and/or ethoxylated alkyl phenols are mainly used as surfactants (Wochenblatt für Papierfabrikation 17, 646 to 649 (1985)).

2. Discussion of Related Art

DE-OS 31 01 444 relates to a process for the deinking of wastepaper using a compound corresponding to the following general formula

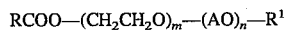

$$RCOO-(CH_2CH_2O)_m-(AO)_n-R^1$$

in which R is a $C_{7-21}$ alkyl or alkenyl group, $R^1$ is a hydrogen atom or a $C_{1-18}$ alkyl, alkenyl or acyl group, AO represents $C_3H_6O$ or $C_4H_8O$ groups or a mixture of $C_2H_4O$, $C_3H_6O$ and $C_4H_8O$ groups, m is an integer of 1 to 100 and n is an integer of 1 to 100.

The use of ethoxylated castor oils for the deinking of printed wastepaper is known, for example, from JP 78/52705, reported in Chem. Abstr. 89 131445j (1978), and from DE 21 48 590. The Japanese patent describes mixtures of castor oil with 10 to 400% ethylene oxide and ethoxylated nonylphenol which are suitable for the removal of printing inks from printed wastepaper. The process disclosed in DE-PS 21 48 590 is concerned with organic materials, for example paper, which are bleached with sodium chlorite in the presence of organic compounds containing at least one ethylene oxide and/or propylene oxide unit. Suitable organic compounds containing at least one alkylene oxide unit include inter alia ethoxylated castor oil.

Further, DE 39 23 393 discloses a process for regenerating wastepaper containing printing ink using an alkoxylation product of a $C_{10}$–$C_{22}$ carboxylic acid or derivative thereof containing an OH group in one or more of the 9, 10, 13 and 14 positions on the carboxylic acid moiety. The alkoxylation product is obtained by epoxidizing unsaturated $C_{10}$–$C22$ carboxylic acids or derivatives thereof, the oxirane ring of the epoxide is then opened by reaction with hydrogen or a protic compound to form hydroxy groups, and this material is then alkoxylated to the final product.

Also, Japan 291952/88 (equivalent to European patent application number 89311550.1) is directed to a deinking composition comprising a reaction product obtained by reacting a glyceride mixture derived from natural oil and fat with ethylene oxide and propylene oxide. The glyceride mixture contains 5 to 10%/wt of monoglycerides, 30 to 45%/wt of diglycerides, and 50 to 70%/wt of triglycerides. The reaction product has a molar ratio of ethylene oxide to propylene oxide of between 1.8 to 2.2 wherein the mole number of added ethylene oxide is between 30 to 80 per mole of glycerides.

In addition, German patent application 40 32 050.2 filed Oct. 9, 1990 relates to regenerating printed wastepaper using the reaction product of alkoxylated aliphatic alcohols, amines, carboxylic acids, and carboxylic amides with epoxidized triglycerides such as $C_{10}$–$C_{22}$ carboxylic acid derivatives.

DESCRIPTION OF THE INVENTION

Other than in the operating examples, or where otherwise indicated, all numbers expressing quantities of ingredients or reaction conditions used herein are to be understood as modified in all instances by the term "about".

It has been found that castor oil derivatives which have been prepared by reacting the hydroxy groups of castor oil with an alkoxylated fatty acid, alcohol, amine, amide, phosphate ester, polyhydroxy alcohol, or sorbitan are eminently suitable in processes for the deinking and regeneration of printed wastepaper.

Accordingly, the present invention relates to a process for the regeneration of wastepaper wherein printed wastepaper is refined in known manner in the presence of deinking compounds obtained by reaction of the hydroxy groups of castor oil with an alkoxylated material selected from the group consisting of alkoxylated aliphatic $C_1$–$C_{22}$ alcohols, alkoxylated aliphatic amines, alkoxylated aliphatic $C_1$–$C_{22}$ carboxylic acids, alkoxylated aliphatic $C_1$–$C_{22}$ carboxylic acid amides, alkoxylated phosphate esters, alkoxylated polyhydroxy alcohols, and alkoxylated sorbitan, and the printing ink particles are subsequently removed from the fiber suspensions in known manner by flotation and/or washing.

Figure 1:
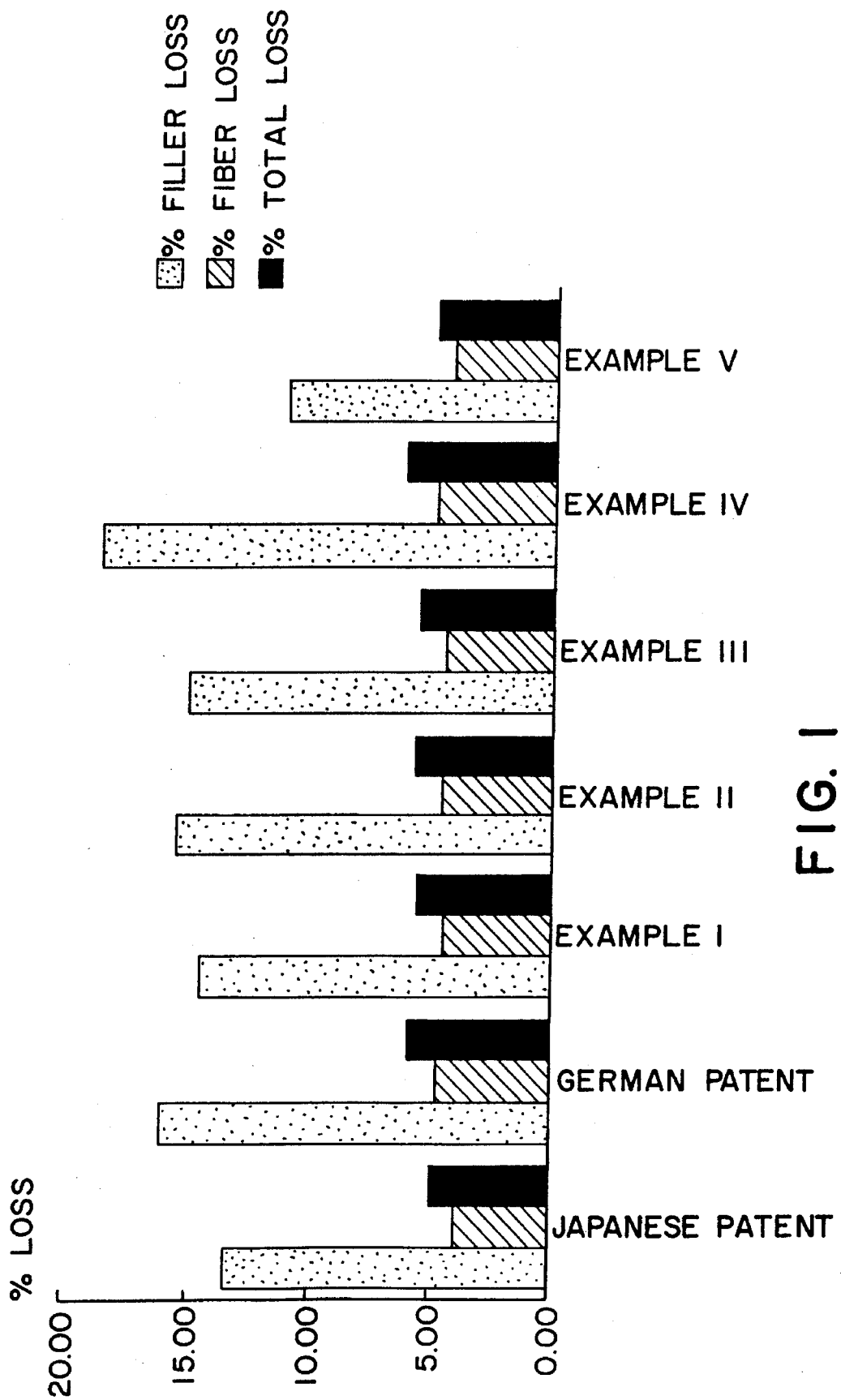
FIG. 1 is a bar graph illustrating a comparison of % filler, % fiber and % total loss obtained when employing a process of regenerating wastepaper according to the present invention using a castor oil derivative versus that of Japanese Patent 291952/88.

The castor oil employed in preparing the castor oil derivatives in accordance with this invention may be any naturally occurring castor oil containing double bonds and hydroxy groups, or the castor oil may be hydrogenated.

The castor oil is reacted with aliphatic $C_1$–$C_{22}$ alcohols alkoxylated with from 2 to 200 moles of ethylene oxide, for example ethoxylated methanol and/or ethoxylated fatty alcohols, aliphatic amines alkoxylated with from 2 to 200 moles of ethylene oxide, for example ethoxylated propylamine, dodecylamine, stearylamine, oleylamine and/or coconut fatty amine, aliphatic $C_{1-22}$ carboxylic acids and/or the amides thereof alkoxylated with from 2 to 200 moles of ethylene oxide, for example ethoxylated propionic acid, stearic acid, oleic acid and/or coconut fatty acid (J. Am. Oil Chem. Soc. 45, 374 (1968)), phosphate esters alkoxylated with from 2 to 200 moles of ethylene oxide, for example, a $C_{12}$–$C_{15}$ alcohol phosphate ester alkoxylated with 5 moles of ethylene oxide, sorbitol alkoxylated with from 2 to 200 moles of ethylene oxide, for example, sorbitol alkoxylated with 40 moles of ethylene oxide, sorbitan alkoxylated with from 2 to 200 moles of ethylene oxide, for example, sorbitan alkoxylated with 40 moles of ethylene oxide, and polyhydroxy alcohols alkoxylated with 2 to 200 moles of ethylene oxide, for example, glycerol alkoxylated with 26 moles of ethylene oxide. It is particularly preferred that the castor oil be reacted with an alkoxylated carboxylic acid, alkoxylated alcohol, or alkoxylated sorbitol.

The afore-mentioned alkoxylated materials may be obtained by known industrial methods, preferably by alkoxylation with ethylene oxide, propylene oxide and/or butylene oxide and more preferably with ethylene oxide and/or propylene oxide, optionally in the presence of catalysts, for example potassium hydroxide and/or sodium methylate, at temperatures of 110° to 200° C. and preferably at temperatures of 140° to 175° C. and under pressures of $10^5$ to $2 \cdot 10^6$ Pa and preferably under pressures of $3 \cdot 10^5$ to $5 \cdot 10^5$ Pa (cf. for example "Chemische Technologie", Vol. 7, pages 131 to 132, Carl-Hanser-Verlag, München/Wein (1986)).

In another embodiment of this invention, it has also been found that deinking chemicals prepared by isomerizing dienoic or trienoic compounds to conjugated intermediates thereof and then reacting the intermediates with unsaturated fatty acids, alcohols, amines, sorbitan esters or sorbitol esters and then alkoxylating the reaction product are eminently suitable in processes for the deinking and regeneration of printed wastepaper. In an alternative embodiment, the conjugated intermediates are reacted with alkoxylated unsaturated fatty acids, alcohols, amines, sorbitan esters or sorbitol esters.

Accordingly, the present invention also relates to a process for the regeneration of wastepaper wherein printed wastepaper is refined in known manner in the presence of deinking chemicals obtained by isomerizing dienoic or trienoic fatty acids in the presence of a conjugation catalyst to form conjugated double bonds therein, and then reacting the conjugated intermediates with an alkoxylated or non-alkoxylated unsaturated fatty acid, alcohol, amine, sorbitan ester or sorbitol ester via the Dieis-Alder condensation polymerization reaction method, and the printing ink particles are subsequently removed from the fiber suspensions in known manner by flotation and/or washing.

More particularly, in preparing the deinking chemicals of this invention, dienoic or trienoic fatty acids are isomerized in the presence of a conjugation catalyst, e.g. anthraquinone and similar compounds, to conjugated intermediates having double bonds by heating the fatty acids or oils at a temperature of from about 260° C. to about 300° C. The conjugated intermediates are then reacted with an alkoxylated or non-alkoxylated unsaturated fatty acid, alcohol, amine, sorbitan ester or sorbitol ester. If the reaction is performed with non-alkoxylated forms of the afore-mentioned materials, then following the reaction, the products are alkoxylated to provide the deinking chemicals of this invention.

The fatty acids suitable for isomerization herein include unsaturated $C_{10}$–$C_{22}$ carboxylic acids which have at least 2 or 3 double bonds in the 9-, 12-, and/or 15-positions, preferably predominantly of unsaturated $C_{16-22}$ carboxylic acids which have at least 2 or 3 double bonds in the 9-, 12- and/or 15-positions, such as olive oil, linseed oil, sunflower oil, safflower oil, soybean oil, peanut oil, cottonseed oil, rapeseed oil which is rich in erucic acid and/or low in erucic acid, palm oil, lard and/or tallow.

After isomerization, the conjugated dienoic structures readily react with any activated double bond to form ring structures. This reaction requires low energy and occurs readily at a reaction temperature of 200°–350° C.

The alkoxylated reactant suitable herein includes alkoxylated aliphatic $C_2$–$C_{22}$ alcohols, alkoxylated aliphatic amines, alkoxylated aliphatic $C_2$–$C_{22}$ carboxylic acids, and alkoxylated aliphatic $C_2$–$C_{22}$ carboxylic acid amides; preferably, aliphatic $C_2$–$C_{22}$ alcohols alkoxylated with from 2 to 200 moles of ethylene oxide, for example, ethoxylated oleyl alcohol or ethoxylated alkenyl alcohols, aliphatic amines alkoxylated with from 2 to 200 moles of ethylene oxide, for example ethoxylated oleylamine, aliphatic $C_2$–$C_{22}$ carboxylic acids or the amides thereof alkoxylated with from 2 to 200 moles of ethylene oxide, for example ethoxylated oleic acid. It is particularly preferred that the reactions be carried out with aliphatic $C_2$–$C_{22}$ alcohols alkoxylated with from 2 to 200 moles of ethylene oxide or aliphatic amines alkoxylated with from 2 to 200 moles of ethylene oxide.

When non-alkoxylated forms of the afore-mentioned reactants are employed, the reaction products may then be alkoxylated by known industrial methods, preferably with ethylene oxide, propylene oxide and/or butylene oxide and more preferably with ethylene oxide and/or propylene oxide, optionally in the presence of catalysts, for example potassium hydroxide and/or sodium methylate, at temperatures of 110° to 200° C. and preferably at temperatures of 140° to 175° C. and under pressures of $10^5$ to $2 \cdot 10^6$ Pa and preferably under pressures of $3 \cdot 10^5$ to $5 \cdot 10^5$ Pa (cf. for example "chemische Technologie", Vol. 7, pages 131 to 132, Carl-Hanser-Verlag, München/Wein (1986)).

The deinking chemicals in accordance with this invention are employed by addition to paper stock suspensions in quantities of preferably 0.01 to 5% by weight and, more preferably, 0.1 to 0.8% by weight, based on air dry paper stock. Air-dry paper stock means that an equilibrium state of internal moisture has established itself in the paper stock. This equilibrium state depends both on the temperature and on the relative humidity of the air.

In many cases, the deinking result, i.e., the removal of printing inks from printed wastepaper, can be improved by using the deinking chemicals of this invention in combination with, for example, $C_{10}$–$C_{22}$ fatty acids, such as Olinor® 4010, Olinor® 4020 and/or Olinor®DG40 (all products of Henkel Corporation), enzymes, surfactants such as ethoxylated $C_6$–$C_{22}$ alcohols, ethoxylated alkylphenols, polymers such as polyacrylamides and/or polydimethylaminoethyl methacrylic acid, and/or copolymers of the type described, for example in DE 38 39 479. The total quantity of these optional constituents is between 0 and 1% by weight, based on air-dry paper stock.

In the presence of the deinking chemicals according to this invention, water-dilutable and/or solvent-containing printing inks and/or solvent-free inks, especially water-dilutable printing inks, for example rotary newsprint inks, book printing inks, offset printing inks, illustration intaglio printing inks, flexographic printing inks, laser printing inks and/or packaging intaglio printing inks, may be removed from printed wastepaper, for example newspapers, magazines, computer paper, journals, brochures, forms, telephone directories and/or catalogues. The deinked wastepaper obtained is distinguished by very high degrees of whiteness.

Printed wastepaper is refined in a pulper at 20° C. to 80° C. at a pulp concentration of, for example, 1 to 30% by weight in an aqueous solution typically containing 0 to 2.0% by weight 100% hydrogen peroxide, 0 to 2.5% by weight NaOH, 0 to 4.0% by weight soda waterglass (silicate) having a solids content of about 35% by weight (37° to 40°Be), 0.01 to 5% by weight of the deinking chemicals according to the invention, and 0 to 1% by weight of the optional constituents mentioned above (all percentages by weight based on air-dry wastepaper). After a residence time of 60 to 120 minutes at temperatures in the range from 20° C. to 80° C., the paper stock suspensions are stirred into water or water is added to them so that 0.6 to 1.6% by weight stock suspensions are obtained. The detached printing ink particles are then removed from the stock suspensions in known manner by washing out or by flotation (Ullmanns Enzyklopädie der technischen Chemie, 4th Edition, Vol. 17, pages 570 to 571 (1979)). Flotation is preferably carried out in known manner, for example in a Denver flotation cell.

Example I

About 150 grams of PEG 600 (Polyethylene glycol molecular weight 600) monolaurate, about 150 grams of PEG 1000 (polyethylene glycol, molecular weight 1000) monostearate, about 100 grams of hydrogenated castor oil and about 0.1 gram of para-toluenesulfonic acid were added to a reaction flask, and the mixture was heated to about 200° C. under a $N_2$ purge. After about 5 hours, the reaction was stopped and the product was found to have a cloud point of about 27° C.

Example II

About 300 grams of PEG 600 (polyethylene glycol, M.W. 600) monolaurate, about 100 grams of castor oil and about 0.3 gram of para-toluenesulfonic acid were added to a reaction flask, and the mixture was heated to about 200° C. under a $N_2$ purge. When the product was found to have a cloud point of about 24° C. (after about 9.5 hours), the reaction was stopped.

Example III

About 300 grams of PEG 600 (polyethylene glycol, M.W. 600) monolaurate, about 100 grams of hydrogenated castor oil and about 0.3 gram of para-toluenesulfonic acid were added to a reaction flask, and the mixture was heated to about 200° C. under a $N_2$ purge. When the product was found to have a cloud point of about 24.5° C. (after about 12 hours), the reaction was stopped.

Example IV

About 150 grams of PEG 600 (polyethylene glycol, M.W. 600) monolaurate, about 150 grams of PEG 1000 (polyethylene glycol, M.W. 1000) monostearate, about 100 grams of hydrogenated castor oil and about 0.3 gram of para-toluene sulfonic acid were added to a reaction flask, and the mixture was heated to about 200° C. under a $N_2$ purge. When the product was found to have a cloud point of about 27° C. (after about 8 hours), the reaction was stopped.

Example V

About 214.78 grams of oleyl alcohol containing 20 moles of ethylene oxide, about 42.98 grams of castor oil and about 0.3 gram of para-toluenesulfonic acid were added to a reaction flask, and the mixture was heated to about 200° C. under a $N_2$ purge. When the product was found to have a cloud point of about 33° C. (after about 1 hour), the reaction was stopped.

Example VI

The products of Examples I, II, III, IV and V were evaluated for brightness gain, filler loss, fiber loss and total loss, and the values obtained were compared with those obtained using the deinking compositions of German Patent 39 23 393 and Japan Patent 291952/88. In this procedure, 100 grams of air-dry (=94 grams bone-dry at about 10% relative humidity) printed wastepaper consisting of about 50%/wt magazines and about 50%/wt newspapers were refined with an aqueous solution containing 0.7%wt of soda waterglass, 37° to 40°Be (35% by weight), 1%/wt of sodium hydroxide (99% by weight), 0.7%/wt of hydrogen peroxide (100% by weight), and 0.2% or 2.0 grams of the reaction product of Examples I to V, in a laboratory pulper (pulp consistency 22% by weight) for 15 minutes at 45° C. and then placing the pulp suspension into a disperger rotating at 2,000 revolutions per minute and, after 5 minutes at 45° C., were diluted to 1% by weight by stirring the stock suspension into water. A sample of the stock suspension was taken to form a pre-float pad. The stock suspension was then floated for 8 minutes at 45° C. in a Denver flotation cell at 1,500 revolutions per minute and another sample of the stock suspension was taken to form a final pad. The stock suspension samples were separated from the water on a Coors porcelain funnel and shaped into a sheet between two filter papers on a vacuum drying press and dried for 5 minutes.

The deinking value (Brightness Gain) was calculated by subtracting the average brightness of the pre-float suspension pad from the average brightness of the after-float suspension pad according to the following formula:

A=Average of 8 readings on the pre-float suspension pad.

B=Average of 8 readings on the after-float suspension pad.

Brightness Gain=A−B

Figure 2:
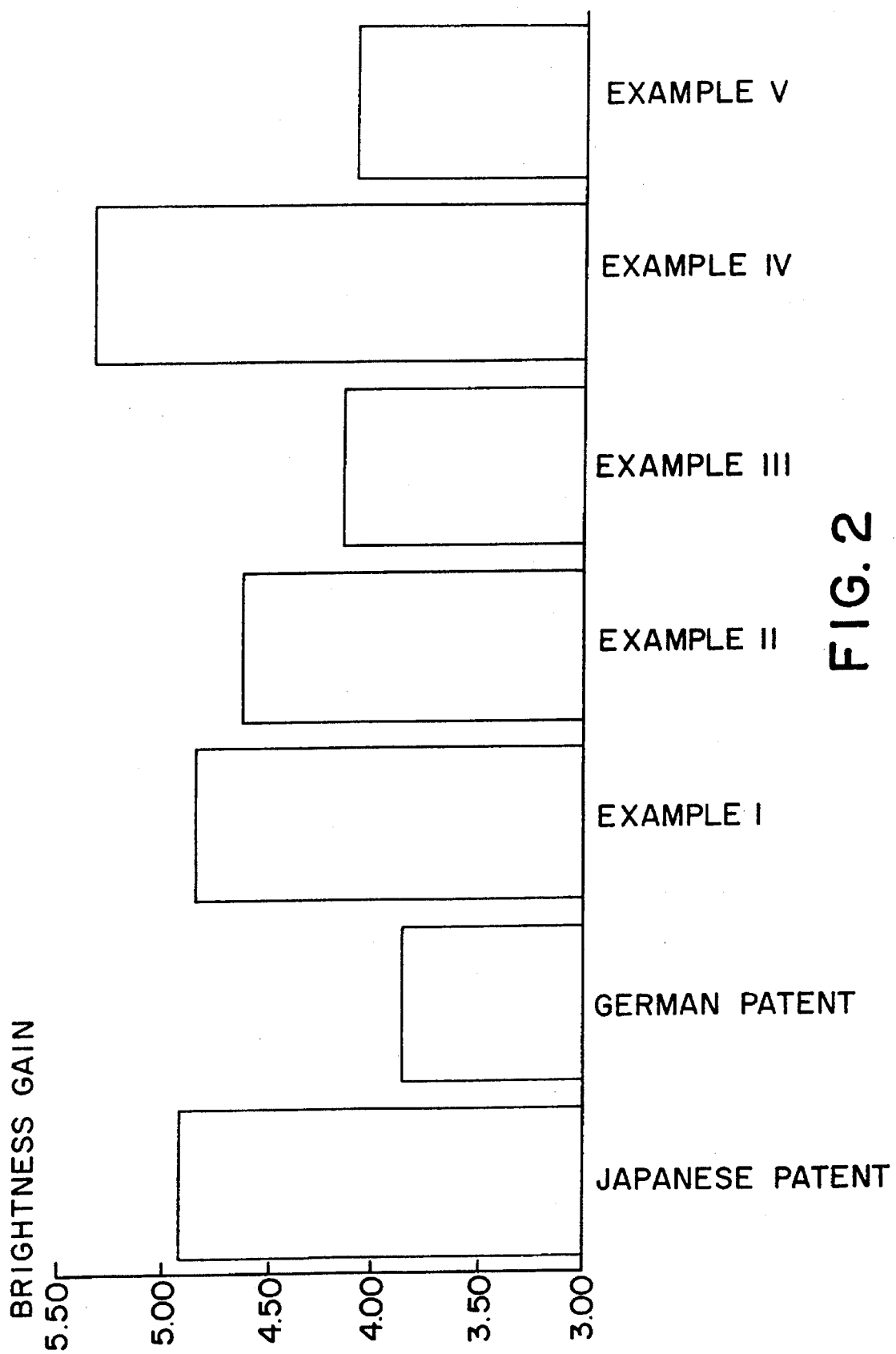
FIG. 2 is a bar graph illustrating a comparison of brightness gain obtained when employing a process of regenerating wastepaper according to the present invention using a castor oil derivative versus that of Japanese Patent 291952/88 and German Patent 39 23 393.

The evaluation results are plotted in FIG. 2 for brightness gain, and in FIG. 1 for percent filler, fiber and total loss. It can be seen therefrom that the castor oil derivatives of this invention performed as well as or better than the composition of German Patent 39 23 393 and that of Japan Patent 291952/88.

Example VII

About 75 grams of safflower oil, about 3.75 grams of anthraquinone and about 225 grams of oleyl alcohol containing 23 moles of ethylene oxide were added to a reaction flask, and the mixture was heated to about 200° C. for about 1 hour under a $N_2$ purge to drive out any moisture. A condenser was attached to the reaction flask and the temperature was raised to about 300° C. The mixture was thus heated for about 7.5 hours. While heating, the cloud point of the solution was monitored, and at a cloud point of about 24° C. the reaction was stopped.

Example VIII

The product of Example VII was evaluated for brightness gain, filler loss, fiber loss and total loss, and the values obtained were compared with those obtained using the deinking composition of German Patent 39 23 393 and Japan Patent 291952/88. In this procedure, 100 grams of air-dry (=94 grams bone-dry at about 10% relative humidity) printed wastepaper consisting of about 50%/wt magazines and about 50%/wt newspapers were refined with an aqueous solution containing 0.7%/wt of soda waterglass, 37° to 40°Be (35% by weight), 1%/wt sodium hydroxide (99% by weight), 0.7%/wt hydrogen peroxide (100% by weight), and 0.2% or 2.0 grams of (1) the reaction product of Example VII, (2) the composition of German Patent 39 23 393, and (3) that of Japan Patent 291952/88 in a laboratory pulper (pulp density 22% by weight) for 15 minutes at 45° C. and then placing the pulp suspension into a disperger rotating at 2000 revolutions per minute and, after 5 minutes at 45° C., were diluted to 1% by weight by stirring the stock suspension into water. A sample of the stock suspension was taken to form a pre-float pad. The stock suspension was then floated for 8 minutes at 45° C. in a Denver flotation cell at 1500 revolutions per minute and another sample of the stock suspension was taken to form a final pad. The stock suspension samples were separated from the water on a Coors porcelain funnel and shaped into a sheet between two filter papers on a vacuum drying press and dried for 5 minutes.

The deinkability value (Brightness Gain) was calculated by subtracting the average brightness of the pre-float suspension pad from the average brightness of the after-float suspension pad according to the following formula:

A=Average of 8 readings on the pre-float suspension pad.

B=Average of 8 readings on the after-float suspension pad.

Brightness Gain=A−B.

Figure 3:
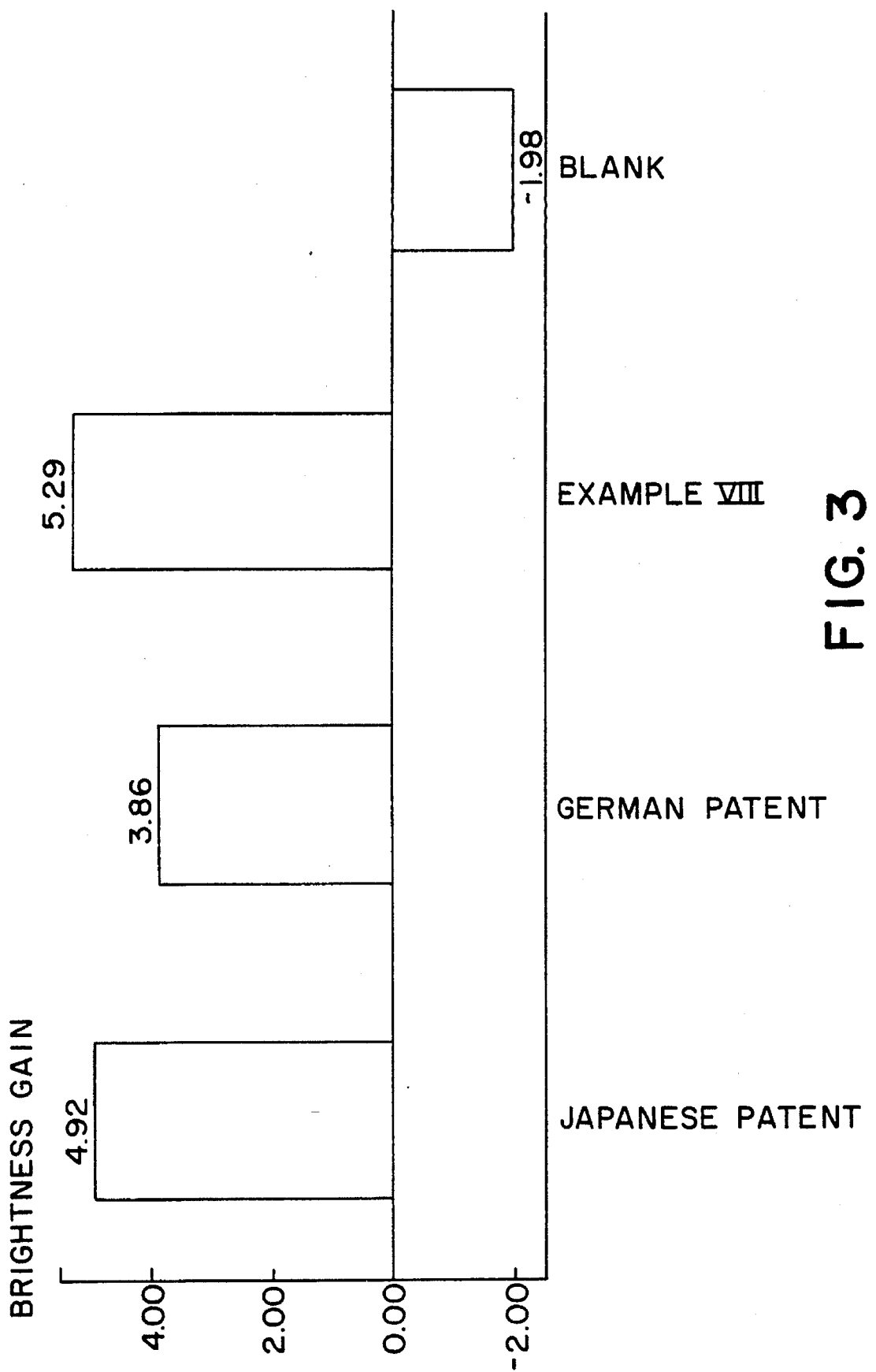
FIG. 3 is a bar graph illustrating a comparison of brightness gain obtained when employing a process of regenerating wastepaper according to the present invention using a safflower oil derivative versus that of Japanese Patent 291952/88 and German Patent 39 23 393.
Figure 4:
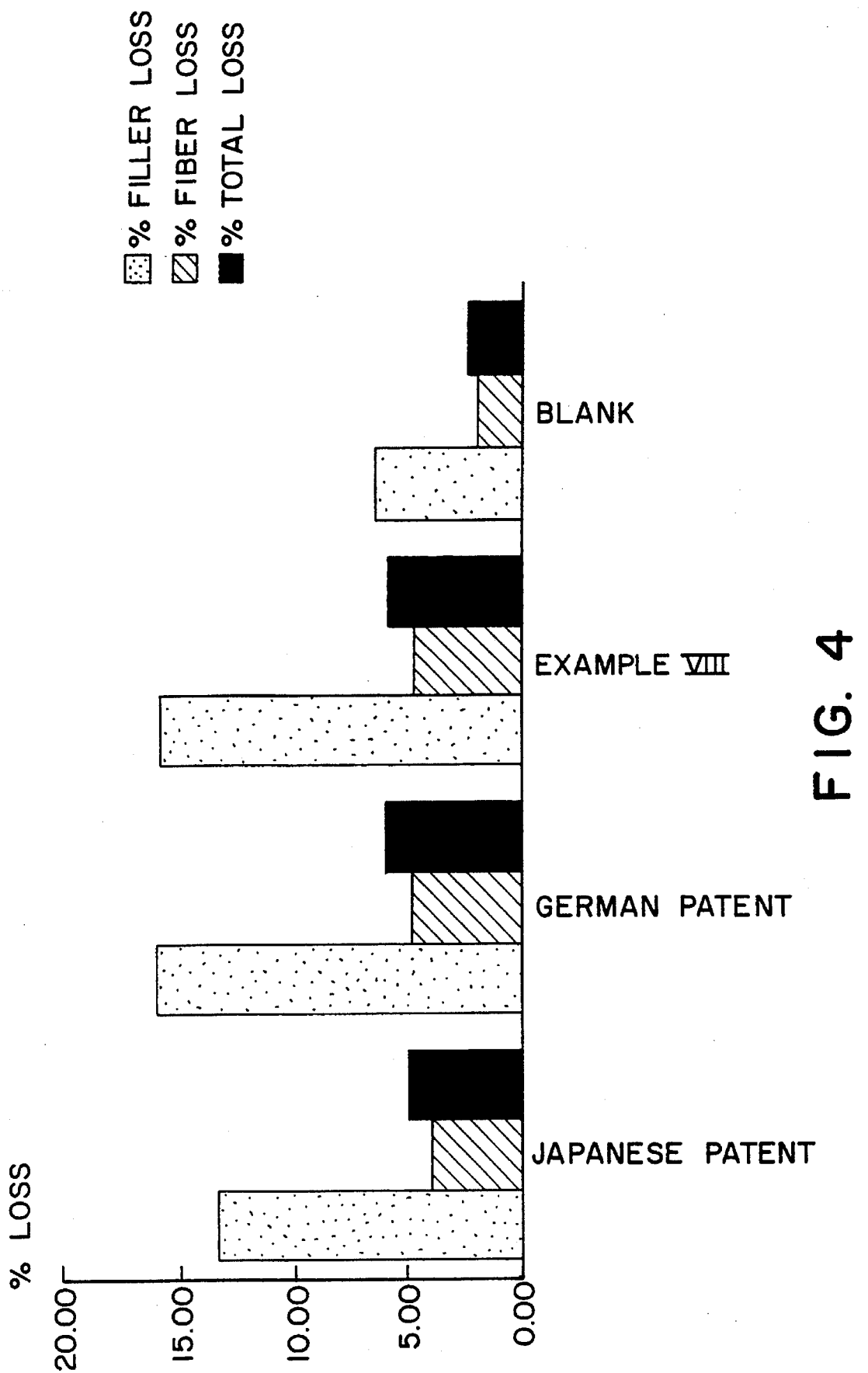
FIG. 4 is a bar graph illustrating a comparison of % filler, % fiber and % total loss obtained when employing a process of regenerating wastepaper according to the present invention using a safflower oil derivative versus that of Japanese Patent 291952/88 and German Patent 39 23 393.

The evaluation results are plotted in FIG. 3 for brightness gain, and in FIG. 4 for percent filler, fiber and total loss. It can be seen therefrom that the deinking chemical of this invention performed as well as or better than the composition of German Patent 39 23 393 and that of Japan Patent 291952/88.

What is claimed is:

1. A process of regenerating wastepaper containing printing ink comprising the steps of:
   (A) fiberizing the wastepaper in an aqueous alkaline deinking solution containing from about 0.01 to about 5% by weight, based on the weight of air dry wastepaper therein, of the reaction products of castor oil with an alkoxylated material selected from the group consisting of alkoxylated aliphatic $C_1$–$C_{22}$ alcohols, alkoxylated aliphatic amines, alkoxylated aliphatic $C_1$–$C_{22}$ carboxylic acids, alkoxylated aliphatic $C_1$–$C_{22}$ carboxylic acid amides, alkoxylated phosphate esters, and alkoxylated polyhydroxy alcohols wherein said alkoxylated material contains at least 2 moles of ethylene oxide, to detach ink particles from said wastepaper; and
   (B) removing the detached ink particles from the deinking solution.

2. A process as in claim 1 wherein said reaction products are present in said deinking solution in an amount of from about 0.1 to about 0.8% by weight based on the air dry weight of the wastepaper therein.

3. A process as in claim 1 wherein said deinking solution also contains at least one of the following:
   a) an alkali metal hydroxide,
   b) an alkali metal silicate,
   c) an oxidative bleach, or
   d) a polymer.

4. A process as in claim 1 wherein said deinking solution also contains
   a) from 0 to about 2.0% by weight of 100% hydrogen peroxide,
   b) from 0 to about 2.5% by weight of sodium hydroxide,
   c) from 0 to about 4.0% by weight of sodium silicate solution having a solids content of about 35% by weight, and
   d) from 0 to about 1% by weight of a polymer selected from the group consisting of polyacrylamides and polydimethylaminoethyl methacrylic acid, said weights being based on the air dry weight of the wastepaper.

5. A process as in claim 1 wherein step (A) is carried out at a temperature of about 20° C. to about 80° C.

6. A process as in claim 1 wherein from about 1 to about 30% by weight, based on the weight of the aqueous solution, of wastepaper is present in said deinking solution.

7. A process as in claim 1 wherein said castor oil is hydrogenated.

8. A process as in claim 1 wherein said alkoxylated material has been alkoxylated with from 2 to 200 moles of ethylene oxide.

9. A process as in claim 1 wherein said alkoxylated material has been alkoxylated with an alkylene oxide selected from the group consisting of ethylene oxide, propylene oxide, and butylene oxide.

10. A process as in claim 1 wherein said alkoxylated polyhydroxy alcohols comprise alkoxylated sorbitan.

* * * * *

UNITED STATES PATENT AND TRADEMARK OFFICE
CERTIFICATE OF CORRECTION

PATENT NO. : 5,505,817
DATED : Apr. 9, 1996
INVENTOR(S) : José M. Rodriguez, Anthony B. Cook, Gail M. Howell It is certified that error appears in the above-indentified patent and that said Letters Patent is hereby corrected as shown below:

In col. 3, line 2, after "Patent 291952/88", insert --and German Patent 39 23 393--.

In col. 4, line 9, "Dieis-Alder" should read "Diels-Alder".

Signed and Sealed this

Twenty-ninth Day of October 1996

Attest:

BRUCE LEHMAN

Attesting Officer

Commissioner of Patents and Trademarks